(12) United States Patent
Pallas

(10) Patent No.: US 10,034,201 B2
(45) Date of Patent: Jul. 24, 2018

(54) STATELESS LOAD-BALANCING ACROSS MULTIPLE TUNNELS

(71) Applicant: Cisco Technology, Inc., San Jose, CA (US)

(72) Inventor: Derrick Pallas, San Francisco, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 150 days.

(21) Appl. No.: 14/795,817

(22) Filed: Jul. 9, 2015

(65) Prior Publication Data

US 2017/0013508 A1    Jan. 12, 2017

(51) Int. Cl.
| H04W 28/08 | (2009.01) |
| H04L 12/803 | (2013.01) |
| H04W 76/12 | (2018.01) |
| H04L 12/743 | (2013.01) |

(52) U.S. Cl.
CPC ........... *H04W 28/08* (2013.01); *H04L 47/125* (2013.01); *H04W 76/12* (2018.02); *H04L 45/7453* (2013.01)

(58) Field of Classification Search
None
See application file for complete search history.

(56) References Cited

U.S. PATENT DOCUMENTS

| 5,812,773 | A  | 9/1998  | Norin |
| 5,889,896 | A  | 3/1999  | Meshinsky et al. |
| 6,108,782 | A  | 8/2000  | Fletcher et al. |
| 6,178,453 | B1 | 1/2001  | Mattaway et al. |
| 6,298,153 | B1 | 10/2001 | Oishi |
| 6,343,290 | B1 | 1/2002  | Cossins et al. |
| 6,643,260 | B1 | 11/2003 | Kloth et al. |
| 6,683,873 | B1 | 1/2004  | Kwok et al. |
| 6,721,804 | B1 | 4/2004  | Rubin et al. |
| 6,733,449 | B1 | 5/2004  | Krishnamurthy et al. |
| 6,735,631 | B1 | 5/2004  | Oehrke et al. |
| 6,996,615 | B1 | 2/2006  | McGuire |
| 7,054,930 | B1 | 5/2006  | Cheriton |

(Continued)

FOREIGN PATENT DOCUMENTS

| CN | 101719930 | 6/2010 |
| CN | 101394360 | 7/2011 |

(Continued)

OTHER PUBLICATIONS

Amedro, Brian, et al., "An Efficient Framework for Running Applications on Clusters, Grids and Cloud," 2010, 17 pages.

(Continued)

*Primary Examiner* — Suk Jin Kang
(74) *Attorney, Agent, or Firm* — Polsinelli PC

(57) ABSTRACT

Systems, methods, and computer-readable storage media for load-balancing are disclosed. An access point receives a communication request and an identifier from a wireless device. The access point determines a plurality of potential endpoints and selects at least one preferred potential endpoint for the wireless device, based on the identifier and the plurality of potential endpoints. The access point establishes a tunnel between the access point and the preferred endpoint for routing traffic associated with the wireless device.

19 Claims, 6 Drawing Sheets

(56) References Cited

U.S. PATENT DOCUMENTS

| | | |
|---|---|---|
| 7,058,706 B1 | 6/2006 | Lyer et al. |
| 7,062,571 B1 | 6/2006 | Dale et al. |
| 7,111,177 B1 | 9/2006 | Chauvel et al. |
| 7,212,490 B1 | 5/2007 | Kao et al. |
| 7,277,948 B2 | 10/2007 | Igarashi et al. |
| 7,313,667 B1 | 12/2007 | Pullela et al. |
| 7,379,846 B1 | 5/2008 | Williams et al. |
| 7,480,672 B2 | 1/2009 | Hahn et al. |
| 7,496,043 B1 | 2/2009 | Leong et al. |
| 7,536,476 B1 | 5/2009 | Alleyne |
| 7,567,504 B2 | 7/2009 | Darling et al. |
| 7,606,147 B2 | 10/2009 | Luft et al. |
| 7,647,594 B1 | 1/2010 | Togawa |
| 7,773,510 B2 | 8/2010 | Back et al. |
| 7,808,897 B1 | 10/2010 | Mehta et al. |
| 7,881,957 B1 | 2/2011 | Cohen et al. |
| 7,917,647 B1 | 3/2011 | Cooper et al. |
| 8,010,598 B2 | 8/2011 | Tanimoto |
| 8,028,071 B1 | 9/2011 | Mahalingam et al. |
| 8,041,714 B2 | 10/2011 | Aymeloglu et al. |
| 8,121,117 B1 | 2/2012 | Amdahl et al. |
| 8,171,415 B2 | 5/2012 | Appleyard et al. |
| 8,234,377 B2 | 7/2012 | Cohn |
| 8,244,559 B2 | 8/2012 | Horvitz et al. |
| 8,250,215 B2 | 8/2012 | Stienhans et al. |
| 8,280,880 B1 | 10/2012 | Aymeloglu et al. |
| 8,284,664 B1 | 10/2012 | Aybay et al. |
| 8,301,746 B2 | 10/2012 | Head et al. |
| 8,345,692 B2 | 1/2013 | Smith |
| 8,406,141 B1 | 3/2013 | Couturier et al. |
| 8,407,413 B1 | 3/2013 | Yucel et al. |
| 8,448,171 B2 | 5/2013 | Donnellan et al. |
| 8,477,610 B2 | 7/2013 | Zuo et al. |
| 8,495,356 B2 | 7/2013 | Ashok et al. |
| 8,510,469 B2 | 8/2013 | Portolani |
| 8,514,868 B2 | 8/2013 | Hill |
| 8,532,108 B2 | 9/2013 | Li et al. |
| 8,533,687 B1 | 9/2013 | Greifeneder et al. |
| 8,547,974 B1 | 10/2013 | Guruswamy et al. |
| 8,560,639 B2 | 10/2013 | Murphy et al. |
| 8,560,663 B2 | 10/2013 | Baucke et al. |
| 8,589,543 B2 | 11/2013 | Dutta et al. |
| 8,590,050 B2 | 11/2013 | Nagpal et al. |
| 8,611,356 B2 | 12/2013 | Yu et al. |
| 8,612,625 B2 | 12/2013 | Andreis et al. |
| 8,630,291 B2 | 1/2014 | Shaffer et al. |
| 8,639,787 B2 | 1/2014 | Lagergren et al. |
| 8,656,024 B2 | 2/2014 | Krishnan et al. |
| 8,660,129 B1 | 2/2014 | Brendel et al. |
| 8,719,804 B2 | 5/2014 | Jain |
| 8,775,576 B2 | 7/2014 | Hebert et al. |
| 8,797,867 B1 | 8/2014 | Chen et al. |
| 8,805,951 B1 | 8/2014 | Faibish et al. |
| 8,850,002 B1* | 9/2014 | Dickinson ............... H04L 47/70 370/395.32 |
| 8,850,182 B1 | 9/2014 | Fritz et al. |
| 8,856,339 B2 | 10/2014 | Mestery et al. |
| 8,909,928 B2 | 12/2014 | Ahmad et al. |
| 8,918,510 B2 | 12/2014 | Gmach et al. |
| 8,924,720 B2 | 12/2014 | Raghuram et al. |
| 8,930,747 B2 | 1/2015 | Levijarvi et al. |
| 8,938,775 B1 | 1/2015 | Roth et al. |
| 8,959,526 B2 | 2/2015 | Kansal et al. |
| 8,977,754 B2 | 3/2015 | Curry, Jr. et al. |
| 9,009,697 B2 | 4/2015 | Breiter et al. |
| 9,015,324 B2 | 4/2015 | Jackson |
| 9,043,439 B2 | 5/2015 | Bicket et al. |
| 9,049,115 B2 | 6/2015 | Rajendran et al. |
| 9,063,789 B2 | 6/2015 | Beaty et al. |
| 9,065,727 B1 | 6/2015 | Liu et al. |
| 9,075,649 B1 | 7/2015 | Bushman et al. |
| 9,130,846 B1* | 9/2015 | Szabo ............... H04L 41/0893 |
| 9,164,795 B1 | 10/2015 | Vincent |
| 9,167,050 B2 | 10/2015 | Durazzo et al. |
| 9,201,701 B2 | 12/2015 | Boldyrev et al. |
| 9,201,704 B2 | 12/2015 | Chang et al. |
| 9,203,784 B2 | 12/2015 | Chang et al. |
| 9,223,634 B2 | 12/2015 | Chang et al. |
| 9,244,776 B2 | 1/2016 | Koza et al. |
| 9,251,114 B1 | 2/2016 | Ancin et al. |
| 9,264,478 B2 | 2/2016 | Hon et al. |
| 9,294,408 B1* | 3/2016 | Dickinson ............... H04L 47/70 |
| 9,313,048 B2 | 4/2016 | Chang et al. |
| 9,361,192 B2 | 6/2016 | Smith et al. |
| 9,379,982 B1* | 6/2016 | Krishna ............... H04L 47/125 |
| 9,380,075 B2 | 6/2016 | He et al. |
| 9,432,245 B1* | 8/2016 | Sorenson, III ........ H04L 47/125 |
| 9,432,294 B1 | 8/2016 | Sharma et al. |
| 9,444,744 B1 | 9/2016 | Sharma et al. |
| 9,473,365 B2 | 10/2016 | Melander et al. |
| 9,503,530 B1 | 11/2016 | Niedzielski |
| 9,558,078 B2 | 1/2017 | Farlee et al. |
| 9,571,570 B1* | 2/2017 | Mutnuru ............ H04L 67/1023 |
| 9,613,078 B2 | 4/2017 | Vermeulen et al. |
| 9,628,471 B1 | 4/2017 | Sundaram et al. |
| 9,658,876 B2 | 5/2017 | Chang et al. |
| 9,692,802 B2 | 6/2017 | Bicket et al. |
| 9,755,858 B2 | 9/2017 | Bagepalli et al. |
| 2002/0073337 A1 | 6/2002 | Ioele et al. |
| 2002/0143928 A1 | 10/2002 | Maltz et al. |
| 2002/0166117 A1 | 11/2002 | Abrams et al. |
| 2002/0174216 A1 | 11/2002 | Shorey et al. |
| 2003/0018591 A1 | 1/2003 | Komisky |
| 2003/0056001 A1 | 3/2003 | Mate et al. |
| 2003/0228585 A1 | 12/2003 | Inoko et al. |
| 2004/0004941 A1 | 1/2004 | Malan et al. |
| 2004/0095237 A1 | 5/2004 | Chen et al. |
| 2004/0131059 A1 | 7/2004 | Ayyakad et al. |
| 2004/0197079 A1* | 10/2004 | Latvala ................ H04L 29/06 386/200 |
| 2004/0264481 A1 | 12/2004 | Darling et al. |
| 2005/0060418 A1 | 3/2005 | Sorokopud |
| 2005/0125424 A1 | 6/2005 | Herriott et al. |
| 2006/0104286 A1 | 5/2006 | Cheriton |
| 2006/0126665 A1 | 6/2006 | Ward et al. |
| 2006/0146825 A1 | 7/2006 | Hofstaedter et al. |
| 2006/0155875 A1 | 7/2006 | Cheriton |
| 2006/0168338 A1 | 7/2006 | Bruegl et al. |
| 2006/0233106 A1* | 10/2006 | Achlioptas ............ H04L 45/745 370/235 |
| 2007/0174663 A1 | 7/2007 | Crawford et al. |
| 2007/0223487 A1 | 9/2007 | Kajekar et al. |
| 2007/0242830 A1 | 10/2007 | Conrado et al. |
| 2008/0005293 A1 | 1/2008 | Bhargava et al. |
| 2008/0084880 A1 | 4/2008 | Dharwadkar |
| 2008/0165778 A1 | 7/2008 | Ertemalp |
| 2008/0198752 A1 | 8/2008 | Fan et al. |
| 2008/0201711 A1 | 8/2008 | Amir Husain |
| 2008/0235755 A1 | 9/2008 | Blaisdell et al. |
| 2009/0006527 A1 | 1/2009 | Gingell, Jr. et al. |
| 2009/0019367 A1 | 1/2009 | Cavagnari et al. |
| 2009/0031312 A1 | 1/2009 | Mausolf et al. |
| 2009/0083183 A1 | 3/2009 | Rao et al. |
| 2009/0138763 A1 | 5/2009 | Arnold |
| 2009/0177775 A1 | 7/2009 | Radia et al. |
| 2009/0178058 A1 | 7/2009 | Stillwell, III et al. |
| 2009/0182874 A1 | 7/2009 | Morford et al. |
| 2009/0265468 A1 | 10/2009 | Annambhotla et al. |
| 2009/0265753 A1 | 10/2009 | Anderson et al. |
| 2009/0293056 A1 | 11/2009 | Ferris |
| 2009/0300608 A1 | 12/2009 | Ferris et al. |
| 2009/0313562 A1 | 12/2009 | Appleyard et al. |
| 2009/0323706 A1 | 12/2009 | Germain et al. |
| 2009/0328031 A1 | 12/2009 | Pouyadou et al. |
| 2010/0036903 A1* | 2/2010 | Ahmad ............... H04L 67/1002 709/202 |
| 2010/0042720 A1 | 2/2010 | Stienhans et al. |
| 2010/0061250 A1 | 3/2010 | Nugent |
| 2010/0115341 A1 | 5/2010 | Baker et al. |
| 2010/0131765 A1 | 5/2010 | Bromley et al. |
| 2010/0149966 A1* | 6/2010 | Achlioptas ............ H04L 45/745 370/217 |
| 2010/0191783 A1 | 7/2010 | Mason et al. |
| 2010/0192157 A1 | 7/2010 | Jackson et al. |

(56) References Cited

U.S. PATENT DOCUMENTS

| | | |
|---|---|---|
| 2010/0205601 A1 | 8/2010 | Abbas et al. |
| 2010/0211782 A1 | 8/2010 | Auradkar et al. |
| 2010/0293270 A1 | 11/2010 | Augenstein et al. |
| 2010/0318609 A1 | 12/2010 | Lahiri et al. |
| 2010/0325199 A1 | 12/2010 | Park et al. |
| 2010/0325441 A1 | 12/2010 | Laurie et al. |
| 2010/0333116 A1 | 12/2010 | Prahlad et al. |
| 2011/0016214 A1 | 1/2011 | Jackson |
| 2011/0035754 A1 | 2/2011 | Srinivasan |
| 2011/0055396 A1 | 3/2011 | Dehaan |
| 2011/0055398 A1 | 3/2011 | Dehaan et al. |
| 2011/0055470 A1 | 3/2011 | Portolani |
| 2011/0072489 A1 | 3/2011 | Parann-Nissany |
| 2011/0075667 A1 | 3/2011 | Li et al. |
| 2011/0110382 A1 | 5/2011 | Jabr et al. |
| 2011/0116443 A1 | 5/2011 | Yu et al. |
| 2011/0126099 A1 | 5/2011 | Anderson et al. |
| 2011/0138055 A1 | 6/2011 | Daly et al. |
| 2011/0145413 A1 | 6/2011 | Dawson et al. |
| 2011/0145657 A1 | 6/2011 | Bishop et al. |
| 2011/0173303 A1 | 7/2011 | Rider |
| 2011/0185063 A1 | 7/2011 | Head et al. |
| 2011/0185065 A1* | 7/2011 | Stanisic ............ G06F 9/505 709/226 |
| 2011/0213966 A1 | 9/2011 | Fu et al. |
| 2011/0219434 A1 | 9/2011 | Betz et al. |
| 2011/0231715 A1 | 9/2011 | Kunii et al. |
| 2011/0231899 A1 | 9/2011 | Pulier et al. |
| 2011/0239039 A1 | 9/2011 | Dieffenbach et al. |
| 2011/0252327 A1 | 10/2011 | Awasthi et al. |
| 2011/0261811 A1 | 10/2011 | Battestilli et al. |
| 2011/0261828 A1 | 10/2011 | Smith |
| 2011/0276675 A1 | 11/2011 | Singh et al. |
| 2011/0276951 A1 | 11/2011 | Jain |
| 2011/0283013 A1* | 11/2011 | Grosser ............ H04L 61/103 709/232 |
| 2011/0295998 A1 | 12/2011 | Ferris et al. |
| 2011/0305149 A1 | 12/2011 | Scott et al. |
| 2011/0307531 A1 | 12/2011 | Gaponenko et al. |
| 2011/0320870 A1 | 12/2011 | Kenigsberg et al. |
| 2012/0005724 A1 | 1/2012 | Lee |
| 2012/0054367 A1 | 3/2012 | Ramakrishnan et al. |
| 2012/0072318 A1 | 3/2012 | Akiyama et al. |
| 2012/0072578 A1 | 3/2012 | Alam |
| 2012/0072581 A1 | 3/2012 | Tung et al. |
| 2012/0072985 A1 | 3/2012 | Davne et al. |
| 2012/0072992 A1 | 3/2012 | Arasaratnam et al. |
| 2012/0084445 A1 | 4/2012 | Brock et al. |
| 2012/0084782 A1 | 4/2012 | Chou et al. |
| 2012/0096134 A1 | 4/2012 | Suit |
| 2012/0102193 A1 | 4/2012 | Rathore et al. |
| 2012/0102199 A1 | 4/2012 | Hopmann et al. |
| 2012/0131174 A1 | 5/2012 | Ferris et al. |
| 2012/0137215 A1 | 5/2012 | Kawara |
| 2012/0158967 A1 | 6/2012 | Sedayao et al. |
| 2012/0159097 A1 | 6/2012 | Jennas, II et al. |
| 2012/0167094 A1 | 6/2012 | Suit |
| 2012/0173710 A1 | 7/2012 | Rodriguez |
| 2012/0179909 A1 | 7/2012 | Sagi et al. |
| 2012/0180044 A1 | 7/2012 | Donnellan et al. |
| 2012/0182891 A1 | 7/2012 | Lee et al. |
| 2012/0185913 A1 | 7/2012 | Martinez et al. |
| 2012/0192016 A1 | 7/2012 | Gotesdyner et al. |
| 2012/0192075 A1 | 7/2012 | Ebtekar et al. |
| 2012/0201135 A1 | 8/2012 | Ding et al. |
| 2012/0214506 A1 | 8/2012 | Skaaksrud et al. |
| 2012/0222106 A1 | 8/2012 | Kuehl |
| 2012/0236716 A1 | 9/2012 | Anbazhagan et al. |
| 2012/0240113 A1 | 9/2012 | Hur |
| 2012/0265976 A1 | 10/2012 | Spiers et al. |
| 2012/0272025 A1 | 10/2012 | Park et al. |
| 2012/0281706 A1 | 11/2012 | Agarwal et al. |
| 2012/0281708 A1 | 11/2012 | Chauhan et al. |
| 2012/0290647 A1 | 11/2012 | Ellison et al. |
| 2012/0297238 A1 | 11/2012 | Watson et al. |
| 2012/0311106 A1 | 12/2012 | Morgan |
| 2012/0311568 A1 | 12/2012 | Jansen |
| 2012/0324092 A1 | 12/2012 | Brown et al. |
| 2012/0324114 A1 | 12/2012 | Dutta et al. |
| 2013/0003567 A1 | 1/2013 | Gallant et al. |
| 2013/0013248 A1 | 1/2013 | Brugler et al. |
| 2013/0036213 A1 | 2/2013 | Hasan et al. |
| 2013/0044636 A1 | 2/2013 | Koponen et al. |
| 2013/0066940 A1 | 3/2013 | Shao |
| 2013/0080509 A1 | 3/2013 | Wang |
| 2013/0080624 A1 | 3/2013 | Nagai et al. |
| 2013/0091557 A1 | 4/2013 | Gurrapu |
| 2013/0097601 A1 | 4/2013 | Podvratnik et al. |
| 2013/0104140 A1 | 4/2013 | Meng et al. |
| 2013/0111540 A1 | 5/2013 | Sabin |
| 2013/0117337 A1 | 5/2013 | Dunham |
| 2013/0124712 A1 | 5/2013 | Parker |
| 2013/0125124 A1 | 5/2013 | Kempf et al. |
| 2013/0138816 A1 | 5/2013 | Kuo et al. |
| 2013/0144978 A1 | 6/2013 | Jain et al. |
| 2013/0152076 A1 | 6/2013 | Patel |
| 2013/0152175 A1 | 6/2013 | Hromoko et al. |
| 2013/0159097 A1 | 6/2013 | Schory et al. |
| 2013/0159496 A1 | 6/2013 | Hamilton et al. |
| 2013/0160008 A1 | 6/2013 | Cawlfield et al. |
| 2013/0162753 A1 | 6/2013 | Hendrickson et al. |
| 2013/0169666 A1 | 7/2013 | Pacheco et al. |
| 2013/0179941 A1 | 7/2013 | McGloin et al. |
| 2013/0182712 A1 | 7/2013 | Aguayo et al. |
| 2013/0185433 A1 | 7/2013 | Zhu et al. |
| 2013/0191106 A1 | 7/2013 | Kephart et al. |
| 2013/0198374 A1 | 8/2013 | Zalmanovitch et al. |
| 2013/0201989 A1* | 8/2013 | Hu ............ H04L 45/24 370/392 |
| 2013/0204849 A1 | 8/2013 | Chacko |
| 2013/0232491 A1 | 9/2013 | Radhakrishnan et al. |
| 2013/0246588 A1 | 9/2013 | Borowicz et al. |
| 2013/0250770 A1 | 9/2013 | Zou et al. |
| 2013/0254415 A1 | 9/2013 | Fullen et al. |
| 2013/0262347 A1 | 10/2013 | Dodson |
| 2013/0283364 A1 | 10/2013 | Chang et al. |
| 2013/0297769 A1 | 11/2013 | Chang et al. |
| 2013/0318240 A1 | 11/2013 | Hebert et al. |
| 2013/0318546 A1 | 11/2013 | Kothuri et al. |
| 2013/0339949 A1 | 12/2013 | Spiers et al. |
| 2014/0006481 A1 | 1/2014 | Frey et al. |
| 2014/0006535 A1 | 1/2014 | Reddy |
| 2014/0006585 A1 | 1/2014 | Dunbar et al. |
| 2014/0040473 A1 | 2/2014 | Ho et al. |
| 2014/0040883 A1 | 2/2014 | Tompkins |
| 2014/0052877 A1 | 2/2014 | Mao |
| 2014/0056146 A1* | 2/2014 | Hu ............ H04L 45/24 370/235 |
| 2014/0059310 A1 | 2/2014 | Du et al. |
| 2014/0074850 A1 | 3/2014 | Noel et al. |
| 2014/0075048 A1 | 3/2014 | Yuksel et al. |
| 2014/0075108 A1 | 3/2014 | Dong et al. |
| 2014/0075357 A1 | 3/2014 | Flores et al. |
| 2014/0075501 A1 | 3/2014 | Srinivasan et al. |
| 2014/0089727 A1 | 3/2014 | Cherkasova et al. |
| 2014/0098762 A1 | 4/2014 | Ghai et al. |
| 2014/0108985 A1 | 4/2014 | Scott et al. |
| 2014/0122560 A1 | 5/2014 | Ramey et al. |
| 2014/0136779 A1 | 5/2014 | Guha et al. |
| 2014/0140211 A1 | 5/2014 | Chandrasekaran et al. |
| 2014/0141720 A1 | 5/2014 | Princen et al. |
| 2014/0156557 A1 | 6/2014 | Zeng et al. |
| 2014/0164486 A1 | 6/2014 | Ravichandran et al. |
| 2014/0188825 A1 | 7/2014 | Muthukkaruppan et al. |
| 2014/0189095 A1 | 7/2014 | Lindberg et al. |
| 2014/0189125 A1 | 7/2014 | Amies et al. |
| 2014/0215471 A1 | 7/2014 | Cherkasova |
| 2014/0222953 A1 | 8/2014 | Karve et al. |
| 2014/0244851 A1 | 8/2014 | Lee |
| 2014/0245298 A1 | 8/2014 | Zhou et al. |
| 2014/0282536 A1 | 9/2014 | Dave et al. |
| 2014/0282611 A1 | 9/2014 | Campbell et al. |
| 2014/0282889 A1 | 9/2014 | Ishaya et al. |
| 2014/0289200 A1 | 9/2014 | Kato |

(56) References Cited

U.S. PATENT DOCUMENTS

| | | |
|---|---|---|
| 2014/0297569 A1 | 10/2014 | Clark et al. |
| 2014/0297835 A1 | 10/2014 | Buys |
| 2014/0310391 A1* | 10/2014 | Sorenson, III .......... H04L 45/24 709/223 |
| 2014/0310417 A1* | 10/2014 | Sorenson, III ...... H04L 67/1002 709/226 |
| 2014/0310418 A1* | 10/2014 | Sorenson, III ...... H04L 67/1002 709/226 |
| 2014/0314078 A1 | 10/2014 | Jilani |
| 2014/0317261 A1 | 10/2014 | Shatzkamer et al. |
| 2014/0321278 A1* | 10/2014 | Cafarelli ............. H04L 47/2441 370/235 |
| 2014/0330976 A1* | 11/2014 | van Bemmel ...... H04L 67/1023 709/226 |
| 2014/0330977 A1* | 11/2014 | van Bemmel .......... H04L 69/22 709/226 |
| 2014/0365680 A1* | 12/2014 | van Bemmel .......... H04L 29/06 709/232 |
| 2014/0366155 A1 | 12/2014 | Chang et al. |
| 2014/0369204 A1* | 12/2014 | Anand ................. H04L 47/125 370/235.1 |
| 2014/0372567 A1 | 12/2014 | Ganesh et al. |
| 2014/0379938 A1* | 12/2014 | Bosch .................. H04L 47/125 709/242 |
| 2015/0033086 A1 | 1/2015 | Sasturkar et al. |
| 2015/0043576 A1 | 2/2015 | Dixon et al. |
| 2015/0052247 A1 | 2/2015 | Threefoot et al. |
| 2015/0052517 A1 | 2/2015 | Raghu et al. |
| 2015/0058382 A1 | 2/2015 | St. Laurent et al. |
| 2015/0058459 A1 | 2/2015 | Amendjian et al. |
| 2015/0071285 A1 | 3/2015 | Kumar et al. |
| 2015/0100471 A1 | 4/2015 | Curry, Jr. et al. |
| 2015/0106802 A1 | 4/2015 | Ivanov et al. |
| 2015/0106805 A1 | 4/2015 | Melander et al. |
| 2015/0117199 A1 | 4/2015 | Chinnaiah Sankaran et al. |
| 2015/0117458 A1 | 4/2015 | Gurkan et al. |
| 2015/0120914 A1 | 4/2015 | Wada et al. |
| 2015/0124622 A1* | 5/2015 | Kovvali ............ H04W 28/0215 370/236 |
| 2015/0178133 A1 | 6/2015 | Phelan et al. |
| 2015/0189009 A1* | 7/2015 | van Bemmel ........ H04L 67/141 709/226 |
| 2015/0215819 A1 | 7/2015 | Bosch et al. |
| 2015/0227405 A1 | 8/2015 | Jan et al. |
| 2015/0242204 A1 | 8/2015 | Hassine et al. |
| 2015/0249709 A1 | 9/2015 | Teng et al. |
| 2015/0280980 A1 | 10/2015 | Bitar |
| 2015/0281067 A1 | 10/2015 | Wu |
| 2015/0281113 A1 | 10/2015 | Siciliano et al. |
| 2015/0309908 A1 | 10/2015 | Pearson et al. |
| 2015/0319063 A1 | 11/2015 | Zourzouvillys et al. |
| 2015/0326524 A1 | 11/2015 | Tankala et al. |
| 2015/0339210 A1 | 11/2015 | Kopp et al. |
| 2015/0373108 A1 | 12/2015 | Fleming et al. |
| 2016/0011925 A1 | 1/2016 | Kulkarni et al. |
| 2016/0013990 A1 | 1/2016 | Kulkarni et al. |
| 2016/0026684 A1* | 1/2016 | Mukherjee ........ G06F 17/30545 707/713 |
| 2016/0062786 A1 | 3/2016 | Meng et al. |
| 2016/0094389 A1* | 3/2016 | Jain ..................... H04L 41/0813 370/236 |
| 2016/0094398 A1 | 3/2016 | Choudhury et al. |
| 2016/0094453 A1* | 3/2016 | Jain ..................... H04L 41/0813 370/235 |
| 2016/0094454 A1* | 3/2016 | Jain ..................... H04L 41/0813 370/235 |
| 2016/0094455 A1* | 3/2016 | Jain ..................... H04L 41/0813 370/235 |
| 2016/0094456 A1* | 3/2016 | Jain ..................... H04L 41/0813 370/235 |
| 2016/0094480 A1 | 3/2016 | Kulkarni et al. |
| 2016/0094643 A1 | 3/2016 | Jain et al. |
| 2016/0099847 A1 | 4/2016 | Melander et al. |
| 2016/0105393 A1 | 4/2016 | Thakkar et al. |
| 2016/0127184 A1 | 5/2016 | Bursell |
| 2016/0134557 A1 | 5/2016 | Steinder et al. |
| 2016/0156708 A1* | 6/2016 | Jalan ................... H04L 67/1027 709/201 |
| 2016/0164780 A1* | 6/2016 | Timmons ................ H04L 45/70 370/238 |
| 2016/0164914 A1 | 6/2016 | Madhav et al. |
| 2016/0182378 A1* | 6/2016 | Basavaraja ........... H04L 45/745 370/235 |
| 2016/0188527 A1 | 6/2016 | Cherian et al. |
| 2016/0234071 A1 | 8/2016 | Nambiar et al. |
| 2016/0239399 A1 | 8/2016 | Babu et al. |
| 2016/0253078 A1 | 9/2016 | Ebtekar et al. |
| 2016/0254968 A1 | 9/2016 | Ebtekar et al. |
| 2016/0261564 A1 | 9/2016 | Foxhoven et al. |
| 2016/0277368 A1 | 9/2016 | Narayanaswamy et al. |
| 2017/0005948 A1 | 1/2017 | Melander et al. |
| 2017/0024260 A1 | 1/2017 | Chandrasekaran et al. |
| 2017/0026294 A1* | 1/2017 | Basavaraja ........... H04L 45/745 |
| 2017/0026470 A1 | 1/2017 | Bhargava et al. |
| 2017/0041342 A1 | 2/2017 | Efremov et al. |
| 2017/0054659 A1 | 2/2017 | Ergin et al. |
| 2017/0097841 A1 | 4/2017 | Chang et al. |
| 2017/0099188 A1 | 4/2017 | Chang et al. |
| 2017/0104755 A1 | 4/2017 | Arregoces et al. |
| 2017/0147297 A1 | 5/2017 | Krishnamurthy et al. |
| 2017/0149878 A1* | 5/2017 | Mutnuru ............. H04L 67/1029 |
| 2017/0171158 A1 | 6/2017 | Hoy et al. |
| 2017/0264663 A1 | 9/2017 | Bicket et al. |
| 2017/0339070 A1 | 11/2017 | Chang et al. |

FOREIGN PATENT DOCUMENTS

| | | |
|---|---|---|
| CN | 102164091 | 8/2011 |
| CN | 104320342 | 1/2015 |
| CN | 105740084 | 7/2016 |
| EP | 2228719 | 9/2010 |
| EP | 2439637 | 4/2012 |
| EP | 2645253 | 11/2014 |
| KR | 10-2015-0070676 | 5/2015 |
| TW | M394537 | 12/2010 |
| WO | WO 2009/155574 | 12/2009 |
| WO | WO 2010/030915 | 3/2010 |
| WO | WO 2013/158707 | 10/2013 |

OTHER PUBLICATIONS

Author Unknown, "5 Benefits of a Storage Gateway in the Cloud," Blog, TwinStrata, Inc., Jul. 25, 2012, XP055141645, 4 pages, https://web.archive.org/web/20120725092619/http://blog.twinstrata.com/2012/07/10/15-benefits-of-a-storage-gateway-in-the-cloud.

Author Unknown, "Joint Cisco and VMWare Solution for Optimizing Virtual Desktop Delivery: Data Center 3.0: Solutions to Accelerate Data Center Virtualization," Cisco Systems, Inc. and VMware, Inc., Sep. 2008, 10 pages.

Author Unknown, "A Look at DeltaCloud: The Multi-Cloud API," Feb. 17, 2012, 4 pages.

Author Unknown, "About Deltacloud," Apache Software Foundation, Aug. 18, 2013, 1 page.

Author Unknown, "Architecture for Managing Clouds, A White Paper from the Open Cloud Standards Incubator," Version 1.0.0, Document No. DSP-IS0102, Jun. 18, 2010, 57 pages.

Author Unknown, "Cloud Infrastructure Management Interface—Common Information Model (CIMI-CIM)," Document No. DSP0264, Version 1.0.0, Dec. 14, 2012, 21 pages.

Author Unknown, "Cloud Infrastructure Management Interface (CIMI) Primer," Document No. DSP2027, Version 1.0.1, Sep. 12, 2012, 30 pages.

Author Unknown, "cloudControl Documentation," Aug. 25, 2013, 14 pages.

Author Unknown, "Interoperable Clouds, A White Paper from the Open Cloud Standards Incubator," Version 1.0.0, Document No. DSP-IS0101, Nov. 11, 2009, 21 pages.

(56) References Cited

OTHER PUBLICATIONS

Author Unknown, "Microsoft Cloud Edge Gateway (MCE) Series Appliance," Iron Networks, Inc., 2014, 4 pages.
Author Unknown, "Open Data Center Alliance Usage: Virtual Machine (VM) Interoperability in a Hybrid Cloud Environment Rev. 1.2," Open Data Center Alliance, Inc., 2013, 18 pages.
Author Unknown, "Real-Time Performance Monitoring on Juniper Networks Devices, Tips and Tools for Assessing and Analyzing Network Efficiency," Juniper Networks, Inc., May 2010, 35 pages.
Author Unknown, "Use Cases and Interactions for Managing Clouds, A White Paper from the Open Cloud Standards Incubator," Version 1.0.0, Document No. DSP-ISO0103, Jun. 16, 2010, 75 pages.
Author Unknown, "Apache Ambari Meetup What's New," Hortonworks Inc., Sep. 2013, 28 pages.
Author Unknown, "Introduction," Apache Ambari project, Apache Software Foundation, 2014, 1 page.
Beyer, Steffen, "Module "Data::Locations?!"," YAPC::Europe, London, UK,ICA, Sep. 22-24, 2000, XP002742700, 15 pages.
Borovick, Lucinda, et al., "Architecting the Network for the Cloud," IDC White Paper, Jan. 2011, 8 pages.
Bosch, Greg, "Virtualization," last modified Apr. 2012 by B. Davison, 33 pages.
Broadcasters Audience Research Board, "What's Next," http://Iwww.barb.co.uk/whats-next, accessed Jul. 22, 2015, 2 pages.
Cisco Systems, Inc. "Best Practices in Deploying Cisco Nexus 1000V Series Switches on Cisco UCS B and C Series Cisco UCS Manager Servers," Cisco White Paper, Apr. 2011, 36 pages, http://www.cisco.com/en/US/prod/collateral/switches/ps9441/ps9902/white_paper_c11-558242.pdf.
Cisco Systems, Inc., "Cisco Unified Network Services: Overcome Obstacles to Cloud-Ready Deployments," Cisco White Paper, Jan. 2011, 6 pages.
Cisco Systems, Inc., "Cisco Intercloud Fabric: Hybrid Cloud with Choice, Consistency, Control and Compliance," Dec. 10, 2014, 22 pages.
Cisco Technology, Inc., "Cisco Expands Videoscape TV Platform Into the Cloud," Jan. 6, 2014, Las Vegas, Nevada, Press Release, 3 pages.
Citrix, "Citrix StoreFront 2.0" White Paper, Proof of Concept Implementation Guide, Citrix Systems, Inc., 2013, 48 pages.
Citrix, "CloudBridge for Microsoft Azure Deployment Guide," 30 pages.
Citrix, "Deployment Practices and Guidelines for NetScaler 10.5 on Amazon Web Services," White Paper, citrix.com, 2014, 14 pages.
CSS Corp, "Enterprise Cloud Gateway (ECG)—Policy driven framework for managing multi-cloud environments," original published on or about Feb. 11, 2012; 1 page; http://www.css-cloud.com/platform/enterprise-cloud-gateway.php.
Fang K., "LISP MAC-EID-TO-RLOC Mapping (LISP based L2VPN)," Network Working Group, Internet Draft, Cisco Systems, Jan. 2012, 12 pages.
Gedymin, Adam, "Cloud Computing with an emphasis on Google App Engine," Sep. 2011, 146 pages.
Good, Nathan A., "Use Apache Deltacloud to administer multiple instances with a single API," Dec. 17, 2012, 7 pages.
Herry, William, "Keep It Simple, Stupid: OpenStack nova-scheduler and its algorithm", May 12, 2012, IBM, 12 pages.
Hewlett-Packard Company, "Virtual context management on network devices", Research Disclosure, vol. 564, No. 60, Apr. 1, 2011, Mason Publications, Hampshire, GB, Apr. 1, 2011, 524.
Juniper Networks, Inc., "Recreating Real Application Traffic in Junosphere Lab," Solution Brief, Dec. 2011, 3 pages.
Kenhui, "Musings on Cloud Computing and IT-as-a-Service: [Updated for Havana] Openstack Computer for VSphere Admins, Part 2: Nova-Scheduler and DRS", Jun. 26, 2013, Cloud Architect Musings, 12 pages.
Kolyshkin, Kirill, "Virtualization in Linux," Sep. 1, 2006, XP055141648, 5 pages, https://web.archive.org/web/20070120205111/http://download.openvz.org/doc/openvz-intro.pdf.
Kunz, Thomas, et al., "OmniCloud—The Secure and Flexible Use of Cloud Storage Services," 2014, 30 pages.
Lerach, S.R.O., "Golem," http://www.lerach.cz/en/products/golem, accessed Jul. 22, 2015, 2 pages.
Linthicum, David, "VM Import could be a game changer for hybrid clouds", InfoWorld, Dec. 23, 2010, 4 pages.
Logan, Marcus, "Hybrid Cloud Application Architecture for Elastic Java-Based Web Applications," F5 Deployment Guide Version 1.1, 2016, 65 pages.
Lynch, Sean, "Monitoring cache with Claspin" Facebook Engineering, Sep. 19, 2012, 5 pages.
Meireles, Fernando Miguel Dias, "Integrated Management of Cloud Computing Resources," 2013-2014, 286 pages.
Mu, Shuai, et al., "uLibCloud: Providing High Available and Uniform Accessing to Multiple Cloud Storages," 2012 IEEE, 8 pages.
Naik, Vijay K., et al., "Harmony: A Desktop Grid for Delivering Enterprise Computations," Grid Computing, 2003, Fourth International Workshop on Proceedings, Nov. 17, 2003, pp. 1-11.
Nair, Srijith K. et al., "Towards Secure Cloud Bursting, Brokerage and Aggregation," 2012, 8 pages, www.flexiant.com.
Nielsen, "SimMetry Audience Measurement—Technology" http://www.nielsen-admosphere.eu/products-and-services/simmetry-audience-measurement-technology/, accessed Jul. 22, 2015, 6 pages.
Nielsen, "Television," http://www.nielsen.com/us/en/solutions/measurement/television.html, accessed Jul. 22, 2015, 4 pages.
Open Stack, "Filter Scheduler," updated Dec. 17, 2017, 5 pages, accessed on Dec. 18, 2017, https://docs.openstack.org/nova/latest/user/filter-scheduler.html.
Rabadan, J., et al., "Operational Aspects of Proxy-ARP/ND in EVPN Networks," BESS Worksgroup Internet Draft, draft-snr-bess-evpn-proxy-arp-nd-02, Oct. 6, 2015, 22 pages.
Saidi, Ali, et al., "Performance Validation of Network-Intensive Workloads on a Full-System Simulator," Interaction between Operating System and Computer Architecture Workshop, (IOSCA 2005), Austin, Texas, Oct. 2005, 10 pages.
Shunra, "Shunra for HP Software; Enabling Confidence in Application Performance Before Deployment," 2010, 2 pages.
Son, Jungmin, "Automatic decision system for efficient resource selection and allocation in inter-clouds," Jun. 2013, 35 pages.
Sun, Aobing, et al., "IaaS Public Cloud Computing Platform Scheduling Model and Optimization Analysis," Int. J. Communications, Network and System Sciences, 2011, 4, 803-811, 9 pages.
Szymaniak, Michal, et al., "Latency-Driven Replica Placement", vol. 47 No. 8, IPSJ Journal, Aug. 2006, 12 pages.
Toews, Everett, "Introduction to Apache jclouds," Apr. 7, 2014, 23 pages.
Von Laszewski, Gregor, et al., "Design of a Dynamic Provisioning System for a Federated Cloud and Bare-metal Environment," 2012, 8 pages.
Wikipedia, "Filter (software)", Wikipedia, Feb. 8, 2014, 2 pages, https://en.wikipedia.org/w/index.php?title=Filter_%28software%29&oldid=594544359.
Wikipedia; "Pipeline (Unix)", VVikipedia, May 4, 2014, 4 pages, https://en.wikipedia.org/w/index.php?title=Pipeline2/028Unix%29&oldid=606980114.
Ye, Xianglong, et al., "A Novel Blocks Placement Strategy for Hadoop," 2012 IEEE/ACTS 11th International Conference on Computer and Information Science, 2012 IEEE, 5 pages.

\* cited by examiner

100

200

400

STATELESS LOAD-BALANCING ACROSS MULTIPLE TUNNELS

TECHNICAL FIELD

The present technology pertains to network load-balancing, and more specifically to stateless load-balancing across multiple tunnels that is implemented by network access points.

BACKGROUND

Computer networks often include wireless access points that allow client devices to connect wirelessly to the network. These access points can use tunnels to transfer device data to and from endpoints throughout the network. In some instances, network resources can be misappropriated because certain endpoints are overloaded while others are under-utilized. In addition, existing load-balancing techniques can be burdensome, requiring the access points to share states by using messages that can further load the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
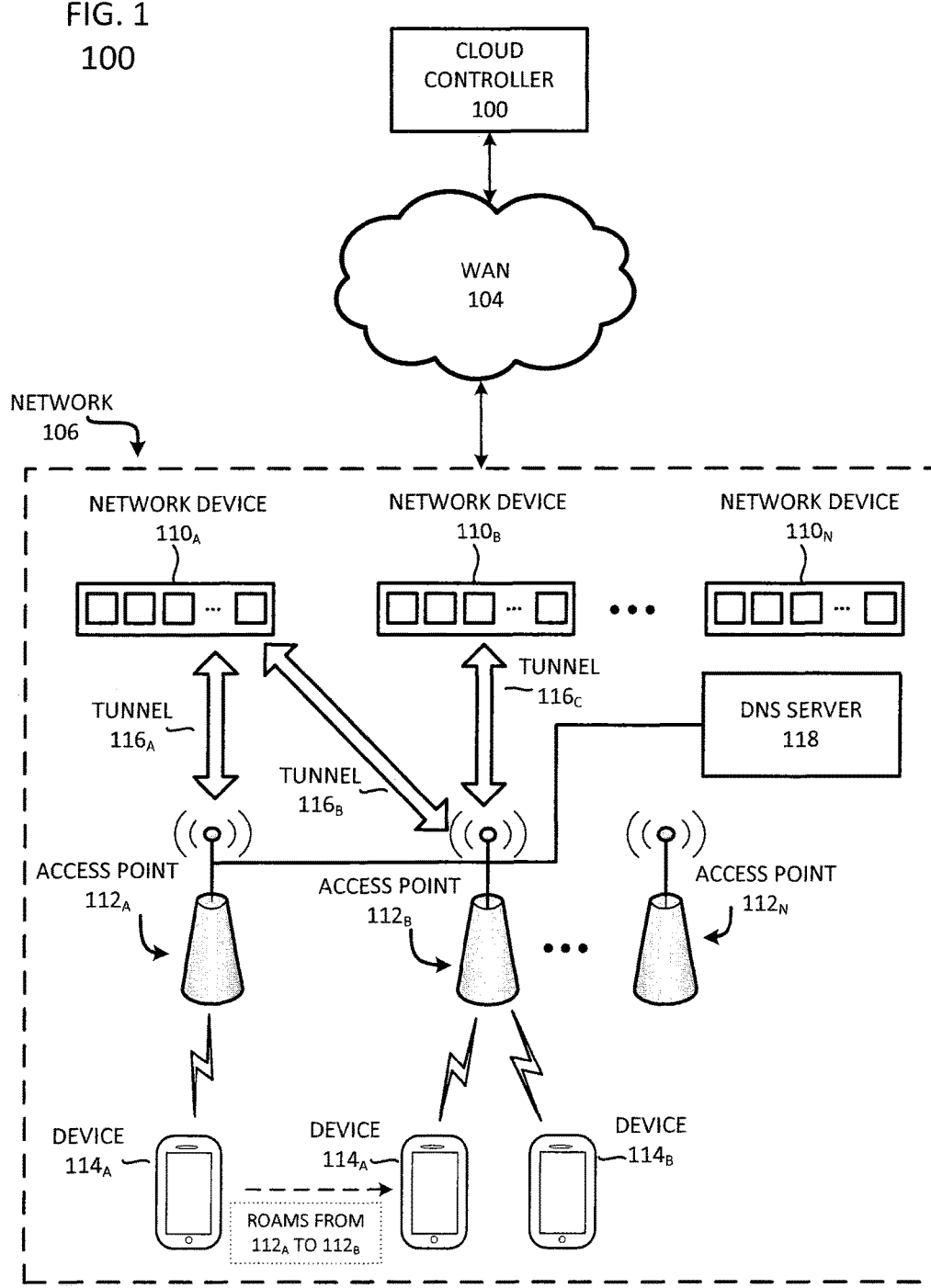
FIG. 1 illustrates an example system for implementing stateless load-balancing.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview:

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The subject technology provides embodiments for implementing stateless load-balancing across multiple tunnels. The method includes receiving, at an access point, a communication request and at least one device identifier from a wireless device. The access point can determine a plurality of potential endpoints for routing traffic to and from the wireless device. The access point can select, based on the device identifier and the plurality of potential endpoints, at least one preferred endpoint for the wireless device. The access point can establish a tunnel between itself and the preferred endpoint. In some aspects, the access point can select the preferred endpoint by implementing a hashing function that uses the device identifier and an endpoint identifier, such as an IP address, for each of the potential endpoints. In a further aspect, the hashing function can be a highest random weight hashing function and the preferred endpoint can correspond to the potential endpoint that yields the highest hash value.

DETAILED DESCRIPTION

A computer network can include a system of hardware, software, protocols, and transmission components that collectively allow separate devices to communicate, share data, and access resources, such as software applications. More specifically, a computer network is a geographically distributed collection of nodes interconnected by communication links and segments for transporting data between endpoints, such as personal computers and workstations. Many types of networks are available, ranging from local area networks (LANs) and wide area networks (WANs) to overlay and software-defined networks, such as virtual extensible local area networks (VXLANs), and virtual networks such as virtual LANs (VLANs) and virtual private networks (VPNs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a public WAN that connects disparate networks throughout the world, providing global communication between nodes on various networks. The nodes typically communicate over the network by exchanging discrete frames or packets of data according to pre-defined protocols, such as the Transmission Control Protocol/Internet Protocol (TCP/IP). In this context, a protocol can refer to a set of rules defining how the nodes interact with each other. Computer networks may be further interconnected by intermediate network nodes, such as routers, switches, hubs, or access points (APs), which can effectively extend the size or footprint of the network.

Networks can be segmented into subnetworks to provide a hierarchical, multilevel routing structure. For example, a network can be segmented into subnetworks using subnet addressing to create network segments. This way, a network can allocate various groups of IP addresses to specific network segments and divide the network into multiple logical networks.

In addition, networks can be divided into logical segments called virtual networks, such as VLANs, which connect logical segments. For example, one or more LANs can be logically segmented to form a VLAN. A VLAN allows a group of machines to communicate as if they were in the same physical network, regardless of their actual physical location. Thus, machines located on different physical LANs can communicate as if they were located on the same physical LAN. Interconnections between networks and devices can also be created using routers and tunnels, such as VPN or secure shell (SSH) tunnels. Tunnels can encrypt point-to-point logical connections across an intermediate network, such as a public network like the Internet. This allows secure communications between the logical connections and across the intermediate network. By interconnecting networks, the number and geographic scope of machines interconnected, as well as the amount of data, resources, and services available to users can be increased.

Further, networks can be extended through network virtualization. Network virtualization allows hardware and software resources to be combined in a virtual network. For example, network virtualization can allow multiple numbers of VMs to be attached to the physical network via respective VLANs. The VMs can be grouped according to their respective VLAN, and can communicate with other VMs as well as other devices on the internal or external network.

To illustrate, overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which VMs communicate. The virtual segments can be identified through a virtual network identifier (VNI), such as a VXLAN network identifier, which can specifically identify an associated virtual segment or domain.

Networks can include various hardware or software appliances or nodes to support data communications, security, and provision services. For example, networks can include routers, hubs, switches, APs, firewalls, repeaters, intrusion detectors, servers, VMs, load balancers, traffic concentrators, application delivery controllers (ADCs), and other hardware or software appliances. Such appliances can be distributed or deployed over one or more physical, overlay, or logical networks. Moreover, appliances can be deployed as clusters, which can be formed using layer 2 (L2) and layer 3 (L3) technologies. Clusters can provide high availability, redundancy, and load-balancing for flows associated with specific appliances or nodes. A flow can include packets that have the same source and destination information. Thus, packets originating from device A to service node B can all be part of the same flow.

Endpoint groups (EPGs) can also be used in a network for mapping applications to the network. In particular, EPGs can use a grouping of application endpoints in a network to apply connectivity and policy to the group of applications. EPGs can act as a container for groups or collections of applications, or application components, and tiers for implementing forwarding and policy logic. EPGs also allow separation of network policy, security, and forwarding from addressing by instead using logical application boundaries.

Appliances or nodes, as well as clusters, can be implemented in cloud deployments. Cloud deployments can be provided in one or more networks to provision computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, network devices, applications, virtual machines (VMs), services, and so forth. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc. Also, services may include various types of services, such as monitoring services, management services, communication services, data services, bandwidth services, routing services, configuration services, wireless services, architecture services, etc.

The cloud may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. In some cases, the cloud can include one or more cloud controllers which can help manage and interconnect various elements in the cloud as well as tenants or clients connected to the cloud.

Cloud controllers and/or other cloud devices can be configured for cloud management. These devices can be pre-configured (i.e, come "out of the box") with centralized management, layer 7 (L7) device and application visibility, real time web-based diagnostics, monitoring, reporting, management, and so forth. As such, in some embodiments, the cloud can provide centralized management, visibility, monitoring, diagnostics, reporting, configuration (e.g., wireless, network, device, or protocol configuration), traffic distribution or redistribution, backup, disaster recovery, control, and any other service. In some cases, this can be done without the cost and complexity of specific appliances or overlay management software.

The disclosed technology addresses the need in the art for stateless load-balancing across multiple tunnels. Disclosed are systems, methods, and computer-readable storage media for implementing stateless load-balancing.

FIG. 1 illustrates an example system 100 used to implement stateless load-balancing across multiple tunnels. The system 100 can include a network 106 connected to a Wide Area Network (WAN) 104 such as the Internet. In some embodiments, network 106 may be a private network that can include one or more local area networks (LANs), VLANs, etc. As one of ordinary skill in the art will readily recognize, network 106 can also or otherwise be connected to any other public or private network in other embodiments. However, WAN 104 is used as a non-limiting example for the sake of clarity.

Network 106 can include one or more devices such as device $114_A$ and device $114_B$ (collectively '114'). Device 114 can include, for example, a client or host device such as a personal computer or terminal, desktop, laptop, tablet, mobile phone, wireless media player, gaming system, etc. For simplicity, network 106 includes only two devices $114_A$ and $114_B$, but one skilled in the art will recognize that network 106 can include any number of devices.

In addition, network 106 can include access points (APs) $112_A, 112_B \ldots 112_N$ (collectively '112'). AP 112 can provide wireless network access to device 114. AP 112 can be connected to network devices $110_A, 110_B \ldots 110_N$ (collectively '110'). The network devices 110 can include L2 and/or L3 devices, such as switches, routers, HUBs, or gateways, for example. In some embodiments, network devices 110 can correspond to a network concentrator that serves as an endpoint for traffic from client devices such as device 114. The particular topology or connections between APs 112 and network devices 110 are not shown in network 106. For example, network 106 can include additional routers, switches, servers, etc. that are not depicted. Those skilled in the art will recognize that the present technology is not limited to a particular network configuration or size.

In some embodiments, network 106 can be a managed network that can be accessed or managed remotely by way of cloud controller 100. Cloud controller 100 can access network 106 via WAN 104 and it can be used to perform a number of network management operations for network 106. For example, cloud controller 100 can be used to manage cloud service provisioning, such as cloud storage, media, streaming, security, or administrative services. Cloud controller 100 can also be used to provision or deploy new hardware and/or software resources in network 100. Cloud controller 100 can also be used to perform remote diagnostics and troubleshooting functions, to measure network performance metrics, to update network configuration settings in each of the network 100 components, etc.

Device 114 can include a wireless transceiver that is capable of communicating with APs 112 using a wireless protocol such as IEEE 802.11x. When device 114 is located within the signal range of AP 112, it can establish a communication session and request to become associated with AP 112. In some embodiments, device 114 can provide particular credentials before it can become associated with AP 112. For example, a Media Access Control (MAC) address of device 114 can be used to determine if device 114 is allowed access to network 106. Alternatively, Remote Authentication Dial in User Service (RADIUS) can be used to determine if device 114 is allowed access to network 106. Authentication may require the user of device 114 to enter a particular password before device 114 can access network 106. In some cases, one or more of the APs 112 can be part of a wireless network, which can include an SSID (service set identifier). Thus, device 114 can join the wireless network using the SSID and/or any other credentials.

Upon successful association, device 114 can gain access to network 106, and can obtain network or data services via AP 112. Network and data services can include internet web browsing, gaming, voice over internet protocol (VOIP), instant messaging, video streaming, video conferencing, computing resources, file sharing, etc. The network and data services can be provided to device 114 according to an address, such as an internet protocol (IP) address, associated with device 114. The IP address of device 114 can be assigned as a static IP address or it can be assigned dynamically according to the Dynamic Host Configuration Protocol (DHCP).

Network traffic for device 114 can be routed to one or more of network devices 110. For example, AP $112_A$ can route the traffic for device $114_A$ to network device $110_A$ by using tunnel $116_A$. That is, network device $110_A$ can be selected as the tunnel endpoint for tunnel $116_A$ that transfers network traffic for device $114_A$. Similarly, AP $112_B$ can route the traffic for device $114_B$ to network device $110_B$ by using tunnel $116_C$. That is, network device $110_B$ can be selected as the tunnel endpoint for tunnel $116_B$ that transfers network traffic for device $114_B$. In some embodiments, tunnel 116 can be a Generic Routing Encapsulation (GRE) tunnel. Alternatively, tunnel 116 can be a Virtual Private Network (VPN) tunnel implemented using Point-to-Point Tunneling Protocol (PPTP).

AP 112 can access or otherwise maintain a list of the potential network devices 110 that are available in the network. Accordingly, AP 112 can implement load-balancing by selectively routing traffic for different devices 114 to different ones of the network devices 110. In one embodiment, AP 112 can obtain the list of potential network devices 110 from a domain name system (DNS) server 118. In another embodiment, the list of potential network devices 110 can be obtained from cloud controller 110. In yet another embodiment, the list of potential network devices 110 can be pre-programmed in AP 112 or autonomously learned by communicating with other APs or devices within network 106.

Each AP 112 can support stateless load-balancing across multiple tunnels by selecting a particular network device 110 for each client device 114 in a deterministic manner. That is, each APs 112 can independently utilize an algorithm that results in a common network device 110 selection for a particular device 114. For example, AP $112_A$ can obtain a device identifier from device $114_A$ and use the device identifier to select an appropriate tunnel endpoint from the network devices 110. The device identifier can be a Media Access Control (MAC) address or a Broadcast Identifier corresponding to device $114_A$. In one embodiment, AP $112_A$ can use the device identifier to perform a hash function with each network device 110. For example, the MAC address from device $114_A$ can be hashed with an Internet Protocol (IP) address for each of the network devices 110. Based on the results of the hash function, AP $112_A$ can select network device $110_A$ as the tunnel endpoint for device $114_A$. In one embodiment, AP 112 can use Rendezvous hashing, i.e. highest random weight hashing, and select the network device 110 that results in the largest hash value. By using a Rendezvous hashing algorithm, AP $112_A$ can efficiently distribute the traffic from its associated devices (only one shown) among all available network devices 110. Rendezvous hashing can yield a distribution that is substantially similar among network devices 110, thus resulting in effective load-balancing.

In some instances, APs 112 can be located near each other such that their respective coverage areas may border each other or overlap. In such a configuration, it is possible for device 114 to roam from one AP to another. For example, device $114_A$ can roam from AP $112_A$ to AP $112_B$. As described above, AP $112_B$ can maintain a list of potential endpoints that includes and identifies network devices 110. AP $112_B$ can also use a device identifier from device $114_A$, e.g. MAC address, to perform the same algorithm (hashing function) that was performed by AP $112_A$. Thus, AP $112_B$ can determine that the preferred endpoint for device $114_A$ corresponds to network device $110_A$. By using the same algorithm, each of AP $112_A$ and AP $112_B$ can independently determine that network device $110_A$ is the preferred endpoint for device $114_A$. Accordingly, AP $112_B$ can use tunnel $116_B$ to continue to route network traffic for device $114_A$ to the same endpoint that was used before device $114_A$ roamed. That is, both AP $112_A$ and AP $112_B$ can tunnel the traffic for device $114_A$ to network device $110_A$.

As will be readily understood by those skilled in the art, each AP 112 can provide access to multiple devices 114. For each device associated with an AP 112, the AP 112 can perform an algorithm to select the preferred endpoint from the potential endpoints that include network devices 110. As described above, the algorithm can be deterministic such that each AP 112 can select the same tunnel endpoint for a particular device 114. In addition, the algorithm can ensure that selections are substantially equal among all available network devices 110, so as to ensure effective load-balancing. For example, AP 112$_B$ can provide network access to device 114$_B$. AP 112$_B$ can utilize the same algorithm to select a preferred endpoint from the list of network devices 110. In this instance, the device identifier obtained from device 114$_B$ can result in network device 110$_B$ as the preferred tunnel endpoint. Accordingly, AP 112$_B$ can route traffic for device 114$_B$ to network device 110$_B$, thus resulting a load-balancing among tunnels established with network device 110$_A$ and 110$_B$ for device 114$_A$ and 114$_B$, respectively.

Figure 2:
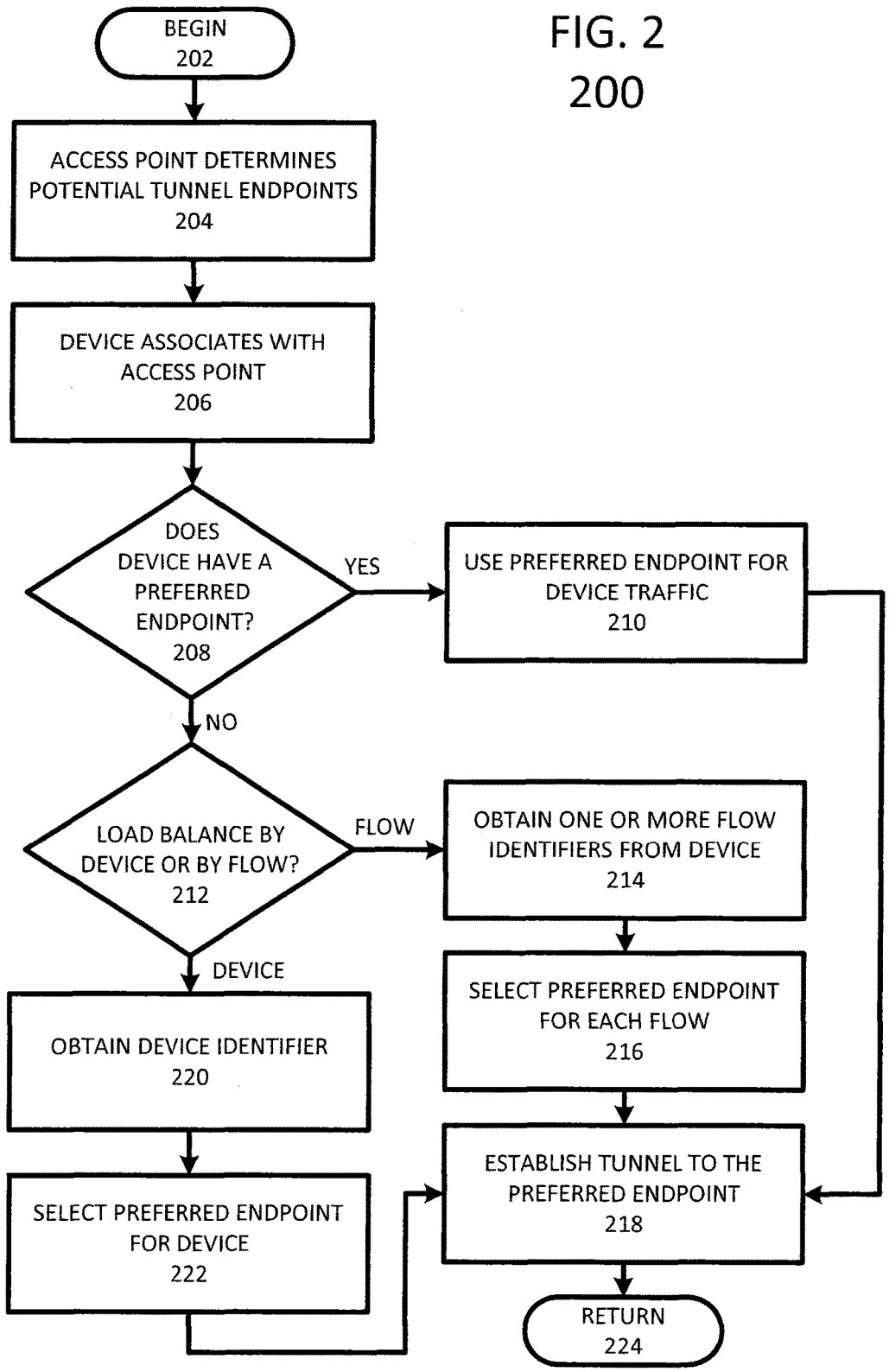
FIG. 2 illustrates an example method for implementing stateless load-balancing.

FIG. 2 illustrates an example method 200 for stateless load-balancing. The method 200 begins at step 202 and proceeds to step 204 where an access point determines potential tunnel endpoints, e.g. routers or traffic concentrators, in the network. In one embodiment, the access point can retrieve a list of potential tunnel endpoints from a DNS server. In another embodiment, the access point can download or receive a list of potential tunnel endpoints from a cloud controller. In another embodiment, the access point can communicate directly with other access points in the network and autonomously learn and share information regarding potential tunnel endpoints. The access point can periodically refresh its list of potential endpoints to make sure it is current. In some instances, the access point can determine that a particular endpoint is no longer functioning properly and it can remove that endpoint from the list of potential endpoints. The access point may also provide an update to the DNS server or directly to neighboring access points when it learns of an endpoint failure. The list of potential endpoints can include an identifier for each potential endpoint such as an IP address.

At step 206, the access point can receive a communication request from a wireless device. The communication request can include a device identifier such as a MAC address for the wireless device. The communication request can include additional credentials or criteria necessary for the wireless device to become associated with the access point and to gain access to network resources.

At step 208, the access point can determine if the wireless device is already associated with a preferred endpoint. That is, any access point in the network can promote an endpoint to being the preferred endpoint for a client. In this case, the client's preferred endpoint can be identified and used by other access points. For example, the access point may receive information from a neighboring access point that includes a preferred endpoint for the wireless device. Alternatively, the network can maintain a distributed store among access points, servers, cloud controllers, or any combination thereof that keeps a list of preferred endpoints for wireless devices that have accessed the network. In another embodiment, the wireless device may communicate a preferred endpoint to the access point as part of its communication request.

If, at step 208, the access point determines that the wireless device is already associated with a preferred endpoint, it can use the preferred endpoint for the device traffic at step 210. Alternatively, if the access point determines that the wireless device is not associated with a preferred endpoint, the method can proceed to step 212 in which the access point determines whether to perform load balancing on a per flow basis or per the device. Device load balancing can take all of the traffic from the wireless device and route it to a single endpoint. Flow load balancing can route different flows from a wireless device to different endpoints. A flow can include a sequence of packets that are sent from a particular source to a particular destination (unicast or multicast). The flow's source node can assign a flow label to a flow. In some instances, a flow can be network traffic that is arbitrarily identified by a source node according to parameters such as protocol, destination IP, destination port, source IP, source port, etc. or some combination thereof. Accordingly, a single wireless device can have multiple flows. In some instances, the option to load balance either per device or per flow can be configured by a network administrator. Alternatively, the access point can make a selection based on current network conditions. In addition, an access point can perform device load balancing for some associated devices while performing flow load balancing for other devices.

If the access point is performing load-balancing per flow, the method proceeds to step 214 where the access point obtains one or more flow identifiers from the wireless device. As mentioned above, a flow identifier can identify a particular sequence of data packets that share a source and a destination. A particular device can have multiple flows at any one time.

Based on the one or more flow identifiers, the access point can select a preferred endpoint for each of the flows at step 216. In one embodiment, the access point can take the first flow identifier and perform a hash function with an identifier that corresponds to each of the potential tunnel endpoints. For example, the IP address for each of the potential tunnel endpoints can be hashed with the first flow identifier in order to determine a preferred tunnel endpoint. For instance, if there are five different potential tunnel endpoints, the hash function can be performed five separate times for each flow identifier. Thus, each flow identifier can be assigned to a particular endpoint as the preferred endpoint for that flow. In some instances, more than one flow can be assigned to the same preferred endpoint.

In one embodiment, the hash function can be a Rendezvous hash function, i.e. highest random weight hashing. Rendezvous hashing is an algorithm that allows clients, e.g. access points, to achieve distributed agreement on which site a given object is to be placed. Each client or access point can independently perform the algorithm and end up with the same result. In addition, Rendezvous hashing can be used for load balancing because each of the potential sites is equally likely to be assigned a particular object. Thus, the access point can perform a Rendezvous hash by concatenating the endpoint's IP address and the flow identifier and hashing the resulting value (e.g. "${endpoint-IP}{flow-ID}") to determine which of the potential tunnel endpoints should be assigned as the preferred endpoint for each flow. This process can be repeated for each of the potential endpoints. Thus, using Rendezvous hashing, the access point can select the endpoint IP address that yields the highest hash value for a particular flow ID. Those that are skilled in the art will recognize that Rendezvous hashing is but one example of a hashing algorithm and that other algorithms can be used with the present technology.

After a preferred endpoint is identified for each of the flows, the method proceeds to step 218 where the access point establishes a tunnel to each preferred endpoint. In one example, the tunnel may be a Generic Routing Encapsulation (GRE) tunnel. GRE is a tunneling protocol that can encapsulate a wide variety of network layer protocols inside virtual point-to-point links over an IP network. In some instances, the tunnel can be an Ethernet over GRE tunnel that includes an Ethernet Header in addition to the GRE header as part of the tunnel protocol. In other embodiments, the tunnel can be established using a Point-to-Point Tunneling Protocol (PPTP). Once the tunnels to each of the preferred endpoints for the corresponding device flows are established, data flows through the tunnel and the method proceeds to step 224 where it returns to previous processing, which can include repeating method 200.

Returning to step 212, if the access point is performing load balancing on a per device basis, the method proceeds to step 220 where the access point obtains a device identifier from the wireless device. The device identifier can include a MAC address, a broadcast ID, an International Mobile Station Equipment Identity (IMEI), serial number, etc. The access point may query the wireless device for the device identifier or it may be provided to the access point as part of the service request and handshaking necessary to associate with the access point.

Once the access point obtains the device identifier, the method can proceed to step 222 in which the access point can select the preferred endpoint for the device. In one embodiment, the device identifier can be hashed with an identifier corresponding to each of the potential tunnel endpoints. For example, the access point can concatenate the endpoint IP address and the client/device identifier and perform a hash on the resulting value (e.g. "${endpoint-IP}${client-ID}"). The process can be repeated for each of the potential endpoints and the hash can be used to determine which of the potential tunnel endpoints should be assigned as the preferred endpoint for the wireless device. As discussed above, one embodiment for the hash function is a Rendezvous hash function. Accordingly, the access point can determine the preferred endpoint for the wireless device by selecting the potential endpoint that yields the largest hash value.

After a preferred endpoint is identified for the wireless device, the method proceeds to step 218 where the access point establishes a tunnel to the preferred endpoint. In one example, the tunnel may be a Generic Routing Encapsulation (GRE) tunnel. In some instances, the tunnel can be an Ethernet over GRE tunnel that includes an Ethernet Header in addition to the GRE header as part of the tunnel protocol. In other embodiments, the tunnel can be established using a Point-to-Point Tunneling Protocol (PPTP). Those that are skilled in the art will recognize that the present technology is not limited to a particular tunneling protocol and any available tunneling protocol can be utilized in conjunction with the present technology.

Once the tunnel to the preferred endpoint for the wireless device is established, data flows through the tunnel to and from the preferred endpoint and the method proceeds to step 224 where it returns to previous processing, which can include repeating method 200.

Figure 3:
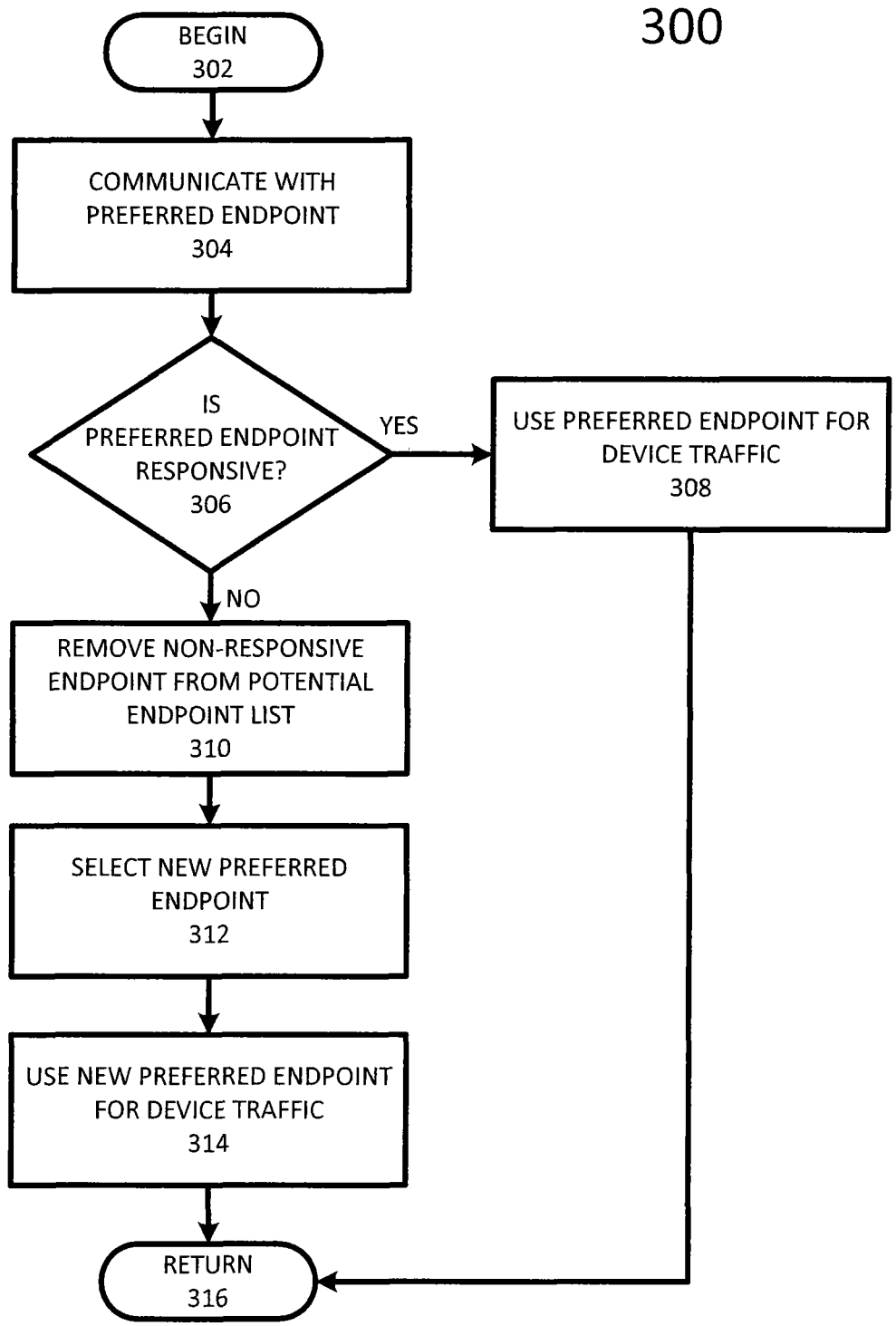
FIG. 3 illustrates a further example method for implementing stateless load-balancing.

FIG. 3 illustrates an example method 300 for stateless load-balancing. The method begins at step 302 and continues to step 304 in which an access point communicates with a preferred tunnel endpoint. As described above with respect to FIG. 2, a preferred tunnel endpoint can be selected and assigned to a particular wireless device or to a particular flow associated with a device. Once the preferred endpoint is selected, traffic pertaining to the device or the flow is routed through a tunnel to/from the preferred endpoint.

At step 306, the access point can monitor the preferred endpoint to determine if it is responsive or if it has failed. For example, the access point can send traffic to a preferred endpoint and wait a predetermined amount of time for a response or an acknowledgment from the endpoint. If no response is received in the predetermined time, the access point can conclude that the preferred endpoint is no longer functional. In some embodiments, the access point can perform the process multiple times before it concludes that the preferred endpoint has failed.

In another embodiment, the access point can record a 'last seen' timestamp when it receives traffic from an endpoint. For example, when traffic is received from a particular endpoint, the 'last seen' timestamp can be set to the present time (e.g. 'now'). The access point can maintain these timestamps for each of the potential tunnel endpoints. When the access point sends client traffic to the tunnel, the access point can determine whether a timer has expired by comparing the 'last seen' timestamp to the current time and determining if a time to failure has been exceeded, e.g. that a timer has expired. In response, the access point can consider the tunnel as having failed. In addition, the access point can send traffic to the endpoints to maintain or 'keep alive' the tunnel. For example, the access point can send pings to each of the potential endpoints to determine if they are responsive. If traffic is received from a previously non-responsive endpoint, the access point can determine that the endpoint is active and the tunnel is no longer failed.

In another embodiment, the access point can monitor the preferred endpoint by using Bidirectional Forwarding Detection (BFD). BFD is a network protocol used to detect faults between two forwarding engines. If a failure is detected using the BFD session, the access point can conclude that the preferred endpoint is no longer functional.

If the access point determines that the preferred endpoint is functional, the method can proceed to step 308 in which the access point continues to use the preferred endpoint for device/flow traffic. Alternatively, if the access point determines that the preferred endpoint is not responsive, the method can proceed to step 310.

At step 310, the access point can remove the non-responsive endpoint from the potential endpoint list. By doing so, the access point can ensure that the non-responsive endpoint is not considered during the preferred endpoint selection process when a new device is associated or when a new flow is identified. In some embodiments, the access point can also communicate the failed endpoint to a DNS server so that it can update its locally stored list. In further embodiments, the access point can communicate directly with neighboring access points and broadcast or unicast messages that identify the failed endpoint. In still further embodiments, the access point can communicate the failed endpoint to a cloud controller that can subsequently notify other access points in the network.

At step 312, the access point can select a new preferred endpoint for any devices or flows that are affected by the non-responsive endpoint. That is, any devices and/or flows that were previously assigned to the non-responsive endpoint can be reassigned to a new preferred endpoint. In some embodiments, the access point can identify the new preferred endpoint by performing the hashing algorithm again for the affected devices and/or flows. Alternatively, the access point can maintain a record of the previous hash and it can default to the next endpoint on the list. For example, if Rendezvous hashing was previously used to select the preferred endpoint, then the access point can select the new preferred endpoint as the endpoint that yielded the second largest hash value, rather than the largest hash value. It can discard the largest hash value because that is the value that corresponded to the non-responsive endpoint.

At step 314, the access point can establish a tunnel with the new preferred endpoint and use it for corresponding device and/or flow traffic. The method can then proceed to step 316 in which the access point returns to previous processing, which can include repeating method 300.

Figure 4:
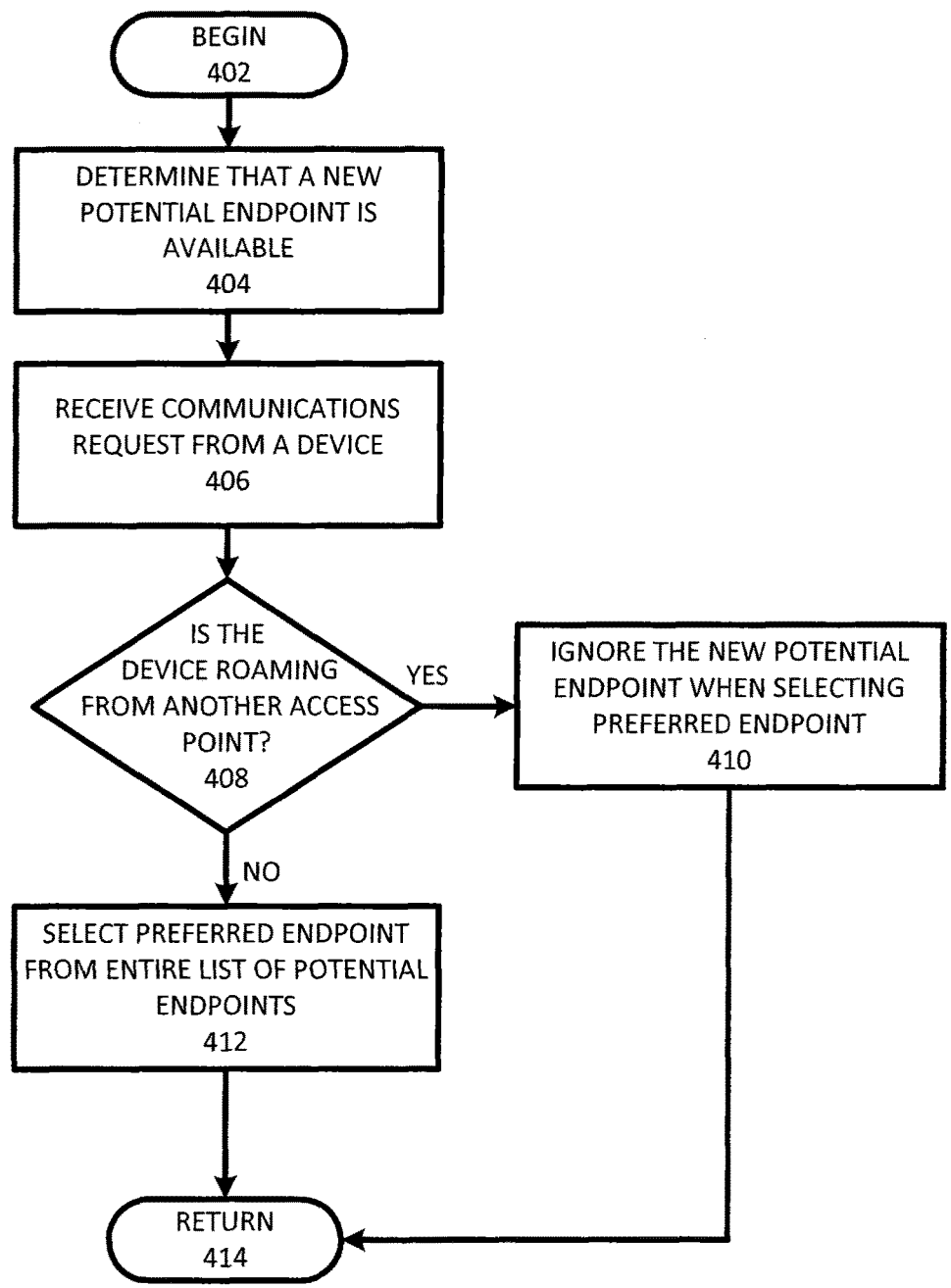
FIG. 4 illustrates a further example method for implementing stateless load-balancing.

FIG. 4 illustrates an example method 400 for stateless load-balancing. The method begins at step 402 and continues to step 404 in which an access point determines that a new potential endpoint is available. For example, the access point may query a DNS server and receive a list of potential endpoints that includes a previously undiscovered or unknown endpoint. Alternatively, a new list of potential endpoints can be configured at the access point by a network administrator or by a cloud controller. The new potential endpoint can be identified as such for a particular time period.

At step 406, the access point can receive a communications request from a device. Accordingly, the access point can perform load balancing by routing device traffic or flow traffic to a selected preferred endpoint. Prior to selecting the preferred endpoint for the new device, at step 408 the access point can determine if the device is roaming from another access point. The access point can determine if the device is roaming by communicating with neighboring access points to share a list of associated devices. Alternatively, a list of devices and their corresponding access points can be saved in a distributed store that can be accessed by each access point in the network.

In the event that the device is roaming, the access point can determine that the device was previously associated with a preferred endpoint, as assigned by the previous access point. Accordingly, the method can proceed to step 410 and the access point can ignore the new potential endpoint when selecting the preferred endpoint for the device. By ignoring the new potential endpoint, the access point can perform the hashing algorithm with the same set of potential endpoints that were used by the previous access point. Thus, the deterministic nature of the algorithm can ensure that the same preferred endpoint is selected and there is minimal disruption to the services provided to the roaming device.

Alternatively, if the device is not roaming, the method can proceed to step 412 in which the access point can select the preferred endpoint using the entire list of potential access points, including the newly added endpoint. The algorithm for selecting the preferred endpoint is run according to the description included above. Thus, the newly added potential endpoint has an equal probability of being assigned as do the rest of the endpoints.

After the new preferred endpoint is selected in either step 410 or 412, the method continues to step 414 where the access point returns to previous processing, which can include repeating method 400.

Example Devices

Figure 5:
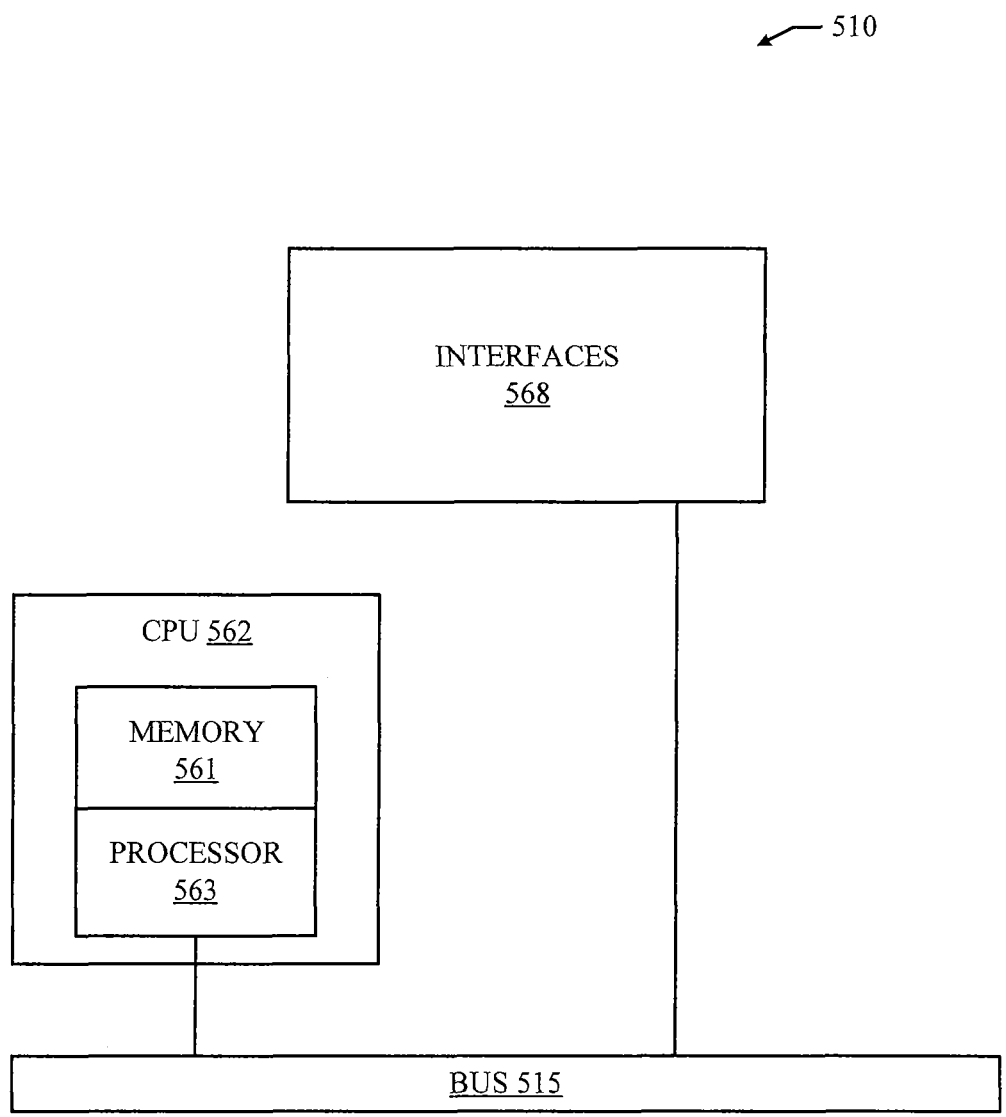
FIG. 5 illustrates an example network device.

FIG. 5 illustrates an example network device 510 suitable for performing stateless load-balancing across multiple tunnels. Network device 510 includes a master central processing unit (CPU) 562, interfaces 568, and a bus 515 (e.g., a PCI bus). When acting under the control of appropriate software or firmware, the CPU 562 is responsible for executing packet management, error detection, and/or routing or forwarding functions. The CPU 562 can accomplish all these functions under the control of software including an operating system and any appropriate applications software. CPU 562 may include one or more processors 563 such as a processor from a standard family of microprocessors, e.g. Motorola, MIPS, ARM, etc. In an alternative embodiment, processor 563 is specially designed hardware for controlling the operations of network device 510. In a specific embodiment, a memory 561 (such as non-volatile RAM and/or ROM) also forms part of CPU 562. However, there are many different ways in which memory could be coupled to the system.

The interfaces 568 can be provided as interface cards (sometimes referred to as "line cards"). Generally, they control the sending and receiving of data packets over the network and sometimes support other peripherals used with the network device 510. Among the interfaces that may be provided are Ethernet interfaces, frame relay interfaces, cable interfaces, DSL interfaces, token ring interfaces, 802.11x interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 562 to efficiently perform routing computations, network diagnostics, security functions, etc.

Although the system shown in FIG. 5 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 561) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 6A:
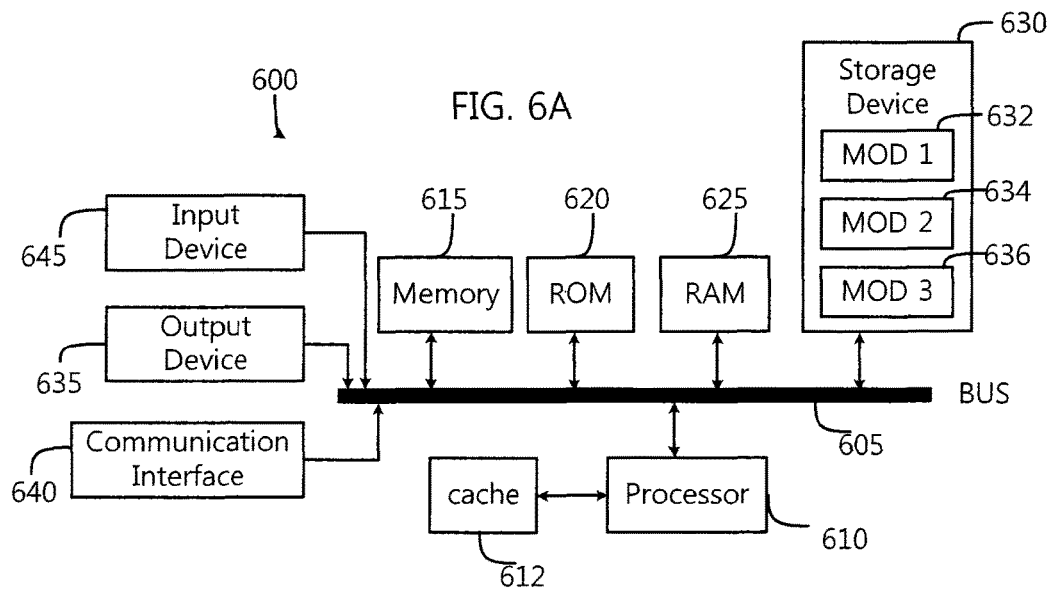
FIGS. 6A and 6B illustrate example system embodiments.
Figure 6B:
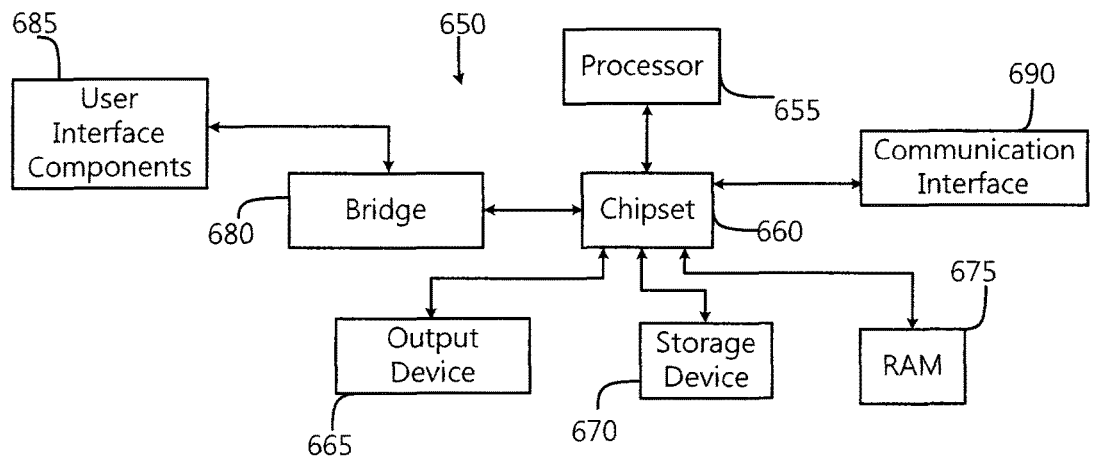

FIG. 6A and FIG. 6B illustrate example system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 670 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 7 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, output device 635, and so forth, to carry out the function.

FIG. 6B illustrates an example computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that example systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

I claim:

1. A method comprising:
receiving, by an access point, a communication request and at least one identifier from a wireless device;
first determining, by the access point, a plurality of potential tunnel endpoints for the wireless device;
second determining whether to perform load balancing on a per flow basis or per the wireless device;
selecting, based on the at least one identifier and the plurality of potential tunnel endpoints, at least one preferred endpoint for the wireless device, the selecting comprising:
in response to a decision by the second determining to perform load balancing on a per flow basis, selecting at least one flow identifier from the wireless device as the at least one identifier;
in response to a decision by the second determining to perform load balancing per the wireless device, obtaining a device identifier from the wireless device as the at least one identifier; and
establishing a tunnel between the access point and the at least one preferred endpoint, wherein the tunnel transfers traffic for the wireless device.

2. The method of claim 1, wherein the selecting further comprises:
obtaining a plurality of endpoint identifiers corresponding to each of the plurality of potential tunnel endpoints; and
performing a hashing function using the at least one identifier and each of the plurality of endpoint identifiers.

3. The method of claim 2, wherein the at least one preferred endpoint corresponds to an endpoint identifier that yields a largest hash value.

4. The method of claim 2, wherein the hashing function comprises a highest random weight hashing function.

5. The method of claim 2, wherein the plurality of endpoint identifiers comprises an internet protocol (IP) address and the at least one identifier comprises a client identifier for the wireless device.

6. The method of claim 1, wherein the tunnel utilizes a generic routing encapsulation (GRE) protocol.

7. The method of claim 1, wherein the plurality of potential tunnel endpoints is determined from a domain name system (DNS) server.

8. An access point on a wireless network, the access point comprising:
a processor; and
a computer-readable storage medium having stored therein instructions which, when executed by the processor, cause the processor to perform operations comprising:
receive a communication request and at least one identifier from a first wireless device;
first determine a plurality of potential tunnel endpoints for the first wireless device;
second determine whether to perform load balancing on a per flow basis or per the wireless device;
perform a hashing function using the at least one identifier and an internet protocol (IP) address corresponding to each of the plurality of potential tunnel endpoints;
select, based on the hashing function, at least one preferred endpoint for the first wireless device, comprising:
in response to a decision by the second determine to perform load balancing on a per flow basis, select at least one flow identifier from the wireless device as the at least one identifier;
in response to a decision by the second determine to perform load balancing per the wireless device, obtaining a device identifier from the wireless device as the at least one identifier; and
establish a tunnel between the access point and the at least one preferred endpoint, wherein the tunnel transfers traffic for the first wireless device.

9. The access point of claim 8, the computer-readable storage medium having stored therein additional instructions which cause the processor to:
receive another communication request from a second wireless device; and
select, based on the hashing function, at least another preferred endpoint for the second wireless device that is different from the at least one preferred endpoint.

10. The access point of claim 8, wherein the at least one identifier comprises a media access control (MAC) address for the first wireless device.

11. The access point of claim 8, wherein the hashing function comprises a highest random weight hashing function.

12. The access point of claim 8, wherein the at least one preferred endpoint corresponds to a highest hash value.

13. A non-transitory computer-readable storage medium having stored therein instructions which, when executed by a processor, cause the processor to perform operations comprising:
receiving, by an access point, a communication request and at least one identifier from a wireless device;
first determining, by the access point, a plurality of potential tunnel endpoints for the wireless device;
second determining whether to perform load balancing on a per flow basis or per the wireless device;
selecting, based on the at least one identifier and the plurality of potential tunnel endpoints, at least one preferred endpoint for the wireless device, the selecting comprising:
in response to a decision by the second determining to perform load balancing on a per flow basis, selecting at least one flow identifier from the wireless device as the at least one identifier;
in response to a decision by the second determining to perform load balancing per the wireless device, obtaining a device identifier from the wireless device as the at least one identifier; and establishing a tunnel between the access point and the at least one preferred endpoint, wherein the tunnel transfers traffic for the wireless device.

14. The non-transitory computer-readable storage medium of claim 13, storing additional instructions which cause the processor to:
performing a hashing function using the at least one identifier and an Internet Protocol (IP) address for each of the plurality of potential tunnel endpoints, wherein the at least one preferred endpoint is selected based on a largest hash value.

15. The non-transitory computer-readable storage medium of claim 14, storing additional instructions which cause the processor to:
in response to determining that the at least one preferred endpoint selected is not available, selecting an endpoint from the plurality of potential tunnel endpoints having a second largest hash value as the at least one preferred endpoint.

16. The non-transitory computer-readable storage medium of claim 13, wherein the wireless device was previously paired to a first access point, and wherein the at least one preferred endpoint matches a preferred endpoint selected by the first access point.

17. The method of claim 1, further comprising:
in response to a determination that the wireless device has a designated preferred endpoint:
bypassing the second determining and the selecting; and
setting the designated preferred endpoint of the wireless device as the at least one preferred endpoint.

18. The access point of claim 8, the operations further comprising:
in response to a determination that the wireless device has a designated preferred endpoint:
bypass the second determine and the select operations; and
set the designated preferred endpoint of the wireless device as the at least one preferred endpoint.

19. The medium of claim 13, the operations further comprising:
in response to a determination that the wireless device has a designated preferred endpoint:
bypassing the second determining and the selecting; and
setting the designated preferred endpoint of the wireless device as the at least one preferred endpoint.

* * * * *